United States Patent [19]
Yagi et al.

[11] Patent Number: 4,912,156
[45] Date of Patent: Mar. 27, 1990

[54] POLYOLEFIN COMPOSITION

[75] Inventors: Masaki Yagi, Ohmiya; Tohru Haruna, Okegawa; Takashi Takeuchi; Toshinori Yukino, both Urawa, all of Japan

[73] Assignee: Adeka Argus Chemical Co., Ltd., Tokyo, Japan

[21] Appl. No.: 225,054

[22] Filed: Jul. 27, 1988

[30] Foreign Application Priority Data

Jul. 30, 1987 [JP] Japan .................. 62-191333

[51] Int. Cl.$^4$ .................. C08K 5/52
[52] U.S. Cl. .................. 524/120; 524/291
[58] Field of Search .................. 524/120, 291

[56] References Cited

U.S. PATENT DOCUMENTS

| | | | |
|---|---|---|---|
| 3,255,151 | 6/1966 | Hecker et al. | 524/583 |
| 3,285,855 | 11/1966 | Dexter et al. | 524/291 |
| 4,180,498 | 12/1979 | Spivack | 524/120 |
| 4,261,880 | 4/1981 | Fodor | 526/125 |
| 4,371,647 | 2/1983 | Minagawa et al. | 524/291 |
| 4,692,539 | 9/1987 | Spivack | 524/120 |

Primary Examiner—Veronica P. Hoke
Attorney, Agent, or Firm—Barnes, Kisselle, Raisch, Choate, Whittemore & Hulbert

[57] ABSTRACT

A polyolefin composition comprises 100 parts by weight of a polyolefine which has been produced with use of a Ziegler catalyst and has a part or residue of the catalyst left therein, 0.005 to 1 part by weight of a phenol compound having the formula (I) and 0.005 to 1 part by weight of an organic phosphite compound having the formula (II).

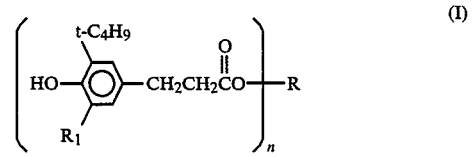

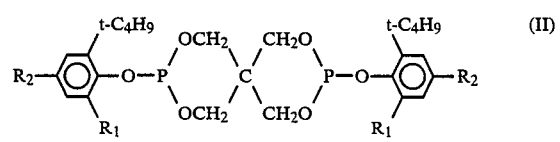

in which R is a residue group of an alcohol being monohydric, dihydric, trihydric or terahydric, R1 is methyl or tert.-butyl, R2 is an alkyl, —CH2CH2COOR3 or —COOR3, R3 being an alkyl, an aryl or an alkylaryl, and n is a number of 1 to 4.

3 Claims, No Drawings

POLYOLEFIN COMPOSITION

INDUSTRIAL FIELD OF UTILIZATION

The present invention relates to a polyolefine composition improved in thermostability (antioxidation), light resistance and hue. The invention relates more particularly to a polyolefine composition improved in thermostability, light resistance and hue, comprising a specific phenol compound and a specific organic phosphite compound added to a polyolefine which is obtained using a Ziegler catalyst and contains a catalyst residue.

PRIOR ART

Heretofore, it has been known that a composition excellent in thermostability and low in discoloration caused by light, etc. can be obtained by the combined addition of a certain phenol-based antioxidant and a certain organic phosphite to a polyolefine. Such a composition, however, suffered from the disadvantage that compared with a polyolefine without the addition of the aforesaid phenol-based antioxidant and organic phosphite, it has a lower brightness, that is, the hue is deteriorated. It is thought that the deterioration of the hue is caused by the fixation of hue peculiar to the organic phosphite in the polyolefine and the interaction between the remaining catalyst in the polyolefine and the phenol-based antioxidant.

Actually, the especially remarkable deterioration of the hue occurred in the polyolefine wherein the catalyst residue after polymerization reaction was not removed.

To prevent such a deterioration of the hue, a method wherein the catalyst residue is decreased by the purification of the polyolefine after polymerization reaction, and a method wherein the bad influence of the catalyst residue is prevented by the addition of a metal deactivator, have been employed independently or combinedly. Namely, the conventional purification has been intended for the reduction of the catalyst residue in the polyolefine, thus requiring complicated procedures and processes and costing a great deal. In recent years, however, catalysts having high activities have been developed, the content of the remaining transition metal components in the polyolefine has come to be held down to a relatively low level, and the bad influence of the remaining catalyst has come to be reduced to a certain extent. Accordingly, attempts have come to be made to reduce costs by simplifying the purification or performing no purification. Even when the catalysts having high activities were used, however, the bad influence of the remaining catalyst could not be remedied to such an extent that the bad influence might be neglected, whereby the aforesaid deterioration of the hue by the remaining catalyst could not be avoided as yet.

The omission of a catalyst removing step in a polyolefine manufacturing process is very advantageous in industries. Accordingly, an improvement in hue in polyolefine products which have not gone through the catalyst removing step is earnestly hoped for.

SUMMARY OF THE INVENTION

The inventors have made various studies in order to obtain a polyolefine composition excellent in thermostability, low in discoloration caused by light, and excellent in hue. As a result, they have discovered that the above-described object can be accomplished even in a polyolefine containing a catalyst residue by the addition of a specific phenol compound and a specific organic phosphite compound to the polyolefine, and attained the present invention.

Namely, the invention provides a polyolefine composition improved in thermostability, light resistance and hue, which comprises 0.005 to 1 part by weight of a phenol compound of the general formula

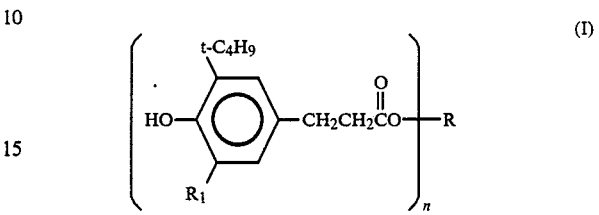

wherein R denotes a monohydric to tetrahydric alcohol residue, $R_1$ denotes a methyl group or a t-butyl group and n is an integer of 1 through 4, and 0.005 to 1 part by weight of an organic phosphite compound of the general formula

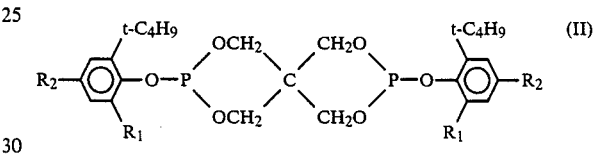

wherein $R_i$ denotes a methyl group or a t-butyl group and $R_2$ denotes an alkyl group, $-CH_2CH_2COOR_3$ or $-COOR_3$ ($R_3$ denotes an alkyl group, an aryl group or an alkyl aryl group), added to 100 parts by weight of a polyolefine which is produced using a Ziegler catalyst and contains a catalyst residue.

A polyolefin composition of the invention comrises 100 parts by weight of a polyolefine produced with use of a Ziegler catalyst and has a part or residue of the catalyst left therein, 0.005 to 1 part by weight of a phenol compound having the formula (I) and 0.005 to 1 part by weight of an organic phosphite compound having the formula (II).

It is preferable that the alcohol for R is pentaerythritol, the alkyl for $R_2$ has 1 to 9 carbon atoms, the alkyl for $R_3$ has 1 to 18 carbon atoms, the aryl for $R_3$ is phenyl and the alkylaryl for $R_3$ is 2,4-di-tert.-butylphenyl.

It is especially advantageous when the polyolefin contains 30 ppm or larger of metals coming from the Ziegler catalyst used.

The invention having the above-described gist will be described in detail hereinafter.

Among the polyolefines to which the invention is applicable are counted high density polyethylene, low density polyethylene, linear low density polyethylene, polypropylene, polybutylene, polybutadiene, cis-polybutadiene rubber, ethylene-propylene polymer, ethylene-propylenediene copolymer, and olefine homopolymers and copolymers such as ethylene-propylene-cyclopendiene copolymer, ethylene-propylene-1,4-cyclooctadiene copolymer, etc.

The stabilizer system of the invention is effective for the polyolefine containing the catalyst residue which has not gone through the catalyst removing step or is obtained by the simplification of the catalyst removing step. The stabilizer has an especially noticeable effect when it is applied to the crude or insufficiently-purified polyolefine containing a relatively high percentage of catalyst residue derived from metallic components in a catalyst, for example, more than 30 ppm, especially more than 50 ppm, of metals such as titanium, aluminium, magnesium, etc. derived from the catalyst. For example, the stabilizer system has a noticeable effect when it is used for the polyolefine to which no deliming treatment is usually applied, such as polypropylene produced using a highly active catalyst which has as a component a transition metal compound carried by magnesium halide. The polyolefine used in the invention may be slightly purified or relatively highly purified one another than crude one.

Examples of the phenol compound of the general formula (I) include monoesters of monohydric alcohols such as methyl, hexyl, octyl, 2-ethyl hexyl, nonyl, decyl, dodecyl, tridecyl, tetradecyl, hexadecyl, octadecyl, eicocyl, dodecyl, tetracocyl and triacontyl alcohols of 3,5-di-t-butyl-4-hydroxyphenylpropionic acid or 3-t-butyl-4-hydroxy-5-methylphenylpropionic acid; diesters of dihydric alcohols such as ethylene glycol, triethylene glycol, propylene glycol, dipropylene glycol, neopentyl glycol, 1,6-hexanediol, thiodiethanol, 3,9-bis (1,1-dimethyl-2-hydroxyethyl)-2,4,8,10-tetraoxaspiro [5,5] undecane and hydrogenated bisphenol-A; triesters of trihydric alcohols such as glyceline, trimethylolpropane, trimethylolethane and tris (2-hydroxyethyl) isocyanurate; and tetraesters of tetrahydric alcohols such as pentaerythritol, ditrimethylolethane and ditrimethylolpropane.

The phenol compound is added in the ratio of 0.005 to 1 part by weight to 100 parts by weight of resin.

Examples of the alkyl group expressed by $R_2$ in the general formula (II) include methyl, ethyl, isopropyl, t-butyl, t-amyl, octyl, isooctyl, t-octyl, nonyl, t-nonyl, etc.

Examples of the alkyl group expressed by $R_3$ include methyl, ethyl, isopropyl, butyl, hexyl, octyl, 2-ethyl hexyl, isooctyl, isodecyl, dodecyl, tetradecyl, hexadecyl, octadecyl, cyclohexyl, benzyl, etc. Examples of the alkyl aryl group include tolyl, xylyl, mesityl, ethyl phenyl, butyl phenyl, 2-t-butyl phenyl, 2,4-di-t-butyl phenyl, 2,4-di-t-amyl phenyl, 2,4-di-t-octyl phenyl, 2-t-butyl-4-methyl phenyl, 2-t-butyl-5-methyl phenyl, etc.

The specific examples of the organic phosphite compound of the general formula (II) include bis (2,6-di-t-butyl- 4-methyl phenyl)pentaerythritoldiphosphite, bis (2,6-di-t-butyl-4-ethyl phenyl) pentaerythritoldiphosphite, bis (2,6-di-t-butyl- 4-methoxycarbonyl phenyl) pentaerythritoldiphosphite, bis (2-t-butyl-4-methoxycarbonyl-6-methyl phenyl) pentaerythritoldiphosphite, bis (2,6-di-t-butyl-4-hexadecyl oxycarbonyl phenyl) pentaerythritoldiphosphite, bis [2,6-di-t-butyl-4-(2′,4′-di-t-butylphenoxycarbonyl) phenyl] pentaerythritoldiphosphite, bis [2,6-di-t-butyl-4-(2′,4′-di-t-amylphenoxycarbonyl) phenyl] pentaerythritoldiphosphite, bis (2,6-di-t-butyl-4-methoxycarbonyl ethyl phenyl) pentaerythritoldiphosphite, bis (2,6-di-t-butyl-4-stearyl oxycarbonyl ethyl phenyl) pentaerythritoldiphosphite, bis (2-t-butyl-4-methoxycarbonyl ethyl-6-methyl phenyl) pentaerythritoldiphosphite, bis (2-t-butyl-4-stearyl oxycarbonyl ethyl-6-methyl phenyl) pentaerythritoldiphosphite, etc.

The phosphite compound is added in the ratio of 0.001 to 10 parts by weight to 100 parts by weight of resin.

To the composition of the invention may be further added a sulfur-based antioxidant to improve the oxidation stability. Examples of the sulfur-based antioxidant include esters (e.g. pentaerythritoltetralaurylthiopropionate) of polyhydric alcohols (e.g. glyceline, trimethylolethane, trimethylolpropane, pentaerythritol, trishydroxyethyl isocyanurate) of dialkylthiodipropionates such as dilauryl-, dimyristyl-, distearyl-, etc. and alkylthiopropionic acids such as butyl-, octyl-, lauryl-, stearyl-, etc.

To the composition of the invention may be added a light stabilizer to improve the light resistance. Examples of the light stabilizer include hydroxybenzophenones such as 2-hydroxy-4-methoxybenzophenone, 2-hydroxy-4-n-octoxybenzophenone, 2,2′-di-hydroxy-4-methoxybenzophenone, 2,4-dihydroxybenzophenone, etc.; benzotriazoles such as 2-(2′-hydroxy-3′-t-butyl-5′-methyl phenyl)-5-chlorobenzotriazole, 2-(2′-hydroxy-3′,5′-di-t-butyl phenyl)-5-chlorobenzotriazole, 2-(2′-hydroxy-5′-methyl phenyl) benzotriazole, 2-(2′-hydroxy-3′,5′-di-t-amyl phenyl) benzotriazole, etc.; benzoates such as phenyl salicylate, p-t-butyl phenyl salicylate, 2,4-di-t-butyl phenyl-3,5-di-t-butyl-4-hydroxybenzoate, hexadecyl-3,5-di-t-butyl-4-hydroxybenzoate, etc.; nickel compounds such as 2,2′-thiobis (4-t-octyl phenol) Ni salt, [2,2′-thiobis (4-t-octyl phenolate)]-n-butylamine Ni, (3,5-di-t-butyl-4-hydroxybenzyl) phosphonic acid monoethyl ester Ni salt, etc.; piperidine compounds such as bis (2,2,6,6-tetramethyl-4-piperidyl) sebacate, bis (1,2,2,6,6-pentamethyl-4-piperidyl)-n-butyl-3,5-di-tertiary butyl-4-hydroxybenzyl-malonate, bis (1-acryloyl-2,2,6,6-tetramethyl-4-piperidyl) bis (3,5-di-tertiary butyl-4-hydroxybenzyl) malonate, tetraxis (2,2,6,6-tetramethyl-4-piperidyl) butane-1,2,3,4-tetracarboxylate, 1-hydroxyethyl-2,2,6,6-tetramethyl-4-piperidinol/diethyl succinate condensate, cyanur chloride/tertiary octylamine/1,6-bis (2,2,6,6-tetramethyl-4-piperidylamino) hexane condensate, etc.; substituted acrylonitriles such as methyl α-cyano-β-methyl-β-(p-methoxyphenyl) acrylate, etc.; and dinianilide oxalates such as diamide N-2-ethyl phenyl-N′-2-ethoxy-5-tertiary butyl phenyl oxalate, diamide N-2-ethyl phenyl-N′-2-ethoxyphenyl oxalate, etc.

The composition of the invention may contain, if necessary, heavy metal deactivators, nucleus formers, metal soaps, organic tin compounds, plasticizers, epoxy compounds, pigments, fillers, blowing agents, antistatic agents, flame retarders, lubricants, processing aids, etc.

WORKING EXAMPLES

The present invention will be described hereinafter by way of examples. However, the invention is not limited by the examples.

EXAMPLE 1

The phenol compound and organic phosphite compound described in Table 1 were added each in an amount of 0.1 part by weight to crude high density polyethylene (Ti: 4, Al: 51, Mg: 3, Si: 42 ppm) followed by well mixing. Hereafter, the resultant composition was pelletized using a conventional extruder at the resin temperature of 250° C. and injection-molded at 250° C. to prepare test pieces of 1 mm thickness.

Using the test pieces, the thermostability, change of hue, and weather resistance were evaluated by the following methods.

The results are shown in Table 1.

Thermostability and Change of Hue

The test piece was placed in a gear oven at 150° C., and the time required for the test piece to be deteriorated (thermostability) was measured. Further, the change of the hue (heat coloring property) of the test piece after 72-hours heating was measured using a Hunter colorimeter and expressed in terms of yellowness degree.

Weather Resistance

The test piece was placed in a weather meter and after 100-hours irradiation at 63° C., the brightness of the test piece was measured using the Hunter colorimeter.

TABLE 1

| No. | Stabilizer | Thermo-stability (hours) | Heat coloring property Original | Heat coloring property After 72 hours | Weather resistance Original | Weather resistance After 100 hours |
|---|---|---|---|---|---|---|
| Comparative example 1 - 1 | Comparative phenol A Comparative phosphite A | 106 | 9.4 | 15.4 | 89.2 | 82.4 |
| 1 - 2 | Phenol No. 1 Comparative phosphite A | 144 | 7.8 | 9.9 | 92.3 | 85.4 |
| Example 1 - 1 | Phenol No. 1 Phosphite No. 1 | 192 | 7.0 | 8.5 | 94.5 | 91.2 |
| 1 - 2 | Phenol No. 1 Phosphite No. 2 | 168 | 7.2 | 9.6 | 96.3 | 93.4 |
| 1 - 3 | Phenol No. 1 Phosphite No. 3 | 198 | 6.5 | 8.1 | 93.2 | 90.6 |
| 1 - 4 | Phenol No. 1 Phosphite No. 4 | 184 | 6.8 | 8.3 | 92.8 | 90.1 |

Comparative phenol A:
2,6-di-t-butyl-4-methyl phenol
Phenol No. 1:
3,5-di-t-butyl-4-hydroxyphenylpropionic acid octadecyl ester
Comparative phosphite A:
bis (2,4-di-t-butyl phenyl) pentaerythritoldiphosphite
Phosphite No. 1:
bis (2,6-di-t-butyl-4-methyl phenyl) pentaerythritoldiphosphite
Phosphite No. 2:
bis [2,6-di-t-butyl-4-(2',4'-di-t-butylphenoxycarbonyl) phenyl] pentaerythritoldiphosphite
Phosphite No. 3:
bis (2,6-di-t-butyl-4-methoxycarbonyl ethyl phenyl) pentaerythritoldiphosphite
Phosphite No. 4:
bis (2,6-di-t-butyl-4-stearyloxycarbonyl etyl phenyl) pentaerythritoldiphosphite

EXAMPLE 2

The phenol compound and organic phosphite compound described in Table 2 were added each in an amount of 0.1 part by weight to crude low density ethylene.butene-1 copolymer (Ti: 3, Al: 82, Mg: 4, Si: 76 ppm) followed by well mixing. Hereafter, the resultant composition was pelletized using a conventional extruder at the resin temperature of 190° C. and injection-molded at 190° C. to prepare test pieces of 1 mm thickness.

Using the test pieces, the same tests as in Example 1 were carried out. Incidentally, the yellowness degree of the test piece after 144-hours heating was measured in the test of the change of hue (heat coloring property). The results are shown in Table 2.

TABLE 2

| No. | Stabilizer | Thermo-stability (hours) | Heat coloring property Original | Heat coloring property After 144 hours | Weather resistance Original | Weather resistance After 100 hours |
|---|---|---|---|---|---|---|
| Comparative example 2 - 1 | Comparative phenol B Comparative phosphite A | 192 | 12.4 | 20.1 | 81.4 | 76.9 |
| 2 - 2 | Phenol No. 2 Comparative phosphite A | 240 | 9.2 | 15.4 | 88.9 | 87.2 |
| Example 2 - 1 | Phenol No. 2 Phosphite No. 1 | 312 | 8.5 | 9.9 | 92.1 | 89.8 |
| 2 - 2 | Phenol No. 2 Phosphite No. 2 | 288 | 8.7 | 10.7 | 93.6 | 92.4 |
| 2 - 3 | Phenol No. 2 Phosphite No. 3 | 338 | 8.2 | 9.1 | 92.4 | 89.9 |
| 2 - 4 | Phenol No. 2 Phosphite No. 4 | 320 | 8.5 | 10.1 | 92.6 | 90.1 |

Comparative phenol B:
1,3,5-trimethyl-2,4,6-tris (3,5-di-t-butyl-4-hydroxybenzyl) benzene
Phenol No. 2:
3,5-di-t-butyl-4-hydroxyphenylpropionic acid pentaerythritol tetraester
Comparative phosphite A:
bis (2,4-di-t-butyl phenyl) pentaerythritoldiphosphite
Phosphite No. 1:

bis (2,6-di-t-butyl-4-methyl phenyl) pentaerythritoldiphosphite

Phosphite No. 2:
bis [2,6-di-t-butyl-4-(2',4'-di-t-butylphenoxycarbonyl) phenyl] pentaerythritoldiphosphite Phosphite No. 3:
bis (2,6-di-t-butyl-4-methoxycarbonyl ethyl phenyl) pentaerythritoldiphosphite Phosphite No. 4:
bis (2,6-di-t-butyl-4-stearyloxycarbonyl ethyl phenyl) pentaerythritoldiphosphite

EXAMPLE 3

0.2 part by weight of the phenol compound and 0.1 part by weight of the organic phosphite compound described in Table 3 and 0.05 part by weight of calcium stearate were added to crude polypropylene (Ti: 4, Al: 13, Mg: 69 ppm) followed by well mixing. Hereafter, the resultant composition was pelletized using a conventional extruder at the resin temperature of 250° C. and injection-molded at 250° C. to prepare test pieces of 1 mm thickness.

Using the test pieces, the same tests as in Example 1 were carried out. Incidentally, the yellowness degree of the test piece after 1000-hours heating was measured in the test of the change of he (heat coloring property).

The results are shown in Table 3.

Phosphite No. 3:
bis (2,6-di-t-butyl-4-methoxycarbonyl ethyl phenyl) pentaerythritoldiphosphite Phosphite No. 4:
bis (2,6-di-t-butyl-4-stearyloxycarbonyl ethyl phenyl) pentaerythritoldiphosphite

EXAMPLE 4

0.2 part by weight of the phenol compound and 0.1 part by weight of the organic phosphite compound described in Table 4 and 0.05 part by weight of calcium stearate were added to crude polypropylene (Ti; 15, Al: 55, Fe: 5, Na: 8 ppm) followed by well mixing. Hereafter, the resultant composition was pelletized using a conventional extruder at the resin temperature of 250° C. and injection-molded at 250° C. to prepare test pieces of 1 mm thickness.

Using the test pieces, the same tests as in Example 3 were carried out.

The results are shown in Table 4.

Comparative phenol B:
1,3,5-trimethyl-2,4,6-tris (3,5-di-t-butyl-4-hydroxybenzyl) benzene Phenol No. 1:
3,5-di-t-butyl-4-hydroxyphenylpropionic acid octadecyl ester Phenol No. 2:

TABLE 3

| No. | Stabilizer | Thermo-stability (hours) | Heat coloring property Original | Heat coloring property After 1000 hours | Weather resistance Original | Weather resistance After 100 hours |
|---|---|---|---|---|---|---|
| Comparative example 3 - 1 | Comparative phenol A Comparative phosphite A | 1150 | 10.2 | 25.6 | 86.4 | 79.8 |
| 3 - 2 | Phenol No. 2 Comparative phosphite A | 1280 | 9.4 | 18.4 | 87.1 | 86.1 |
| Example 3 - 1 | Phenol No. 2 Phosphite No. 1 | 1400 | 7.5 | 13.0 | 92.1 | 91.1 |
| 3 - 2 | Phenol No. 2 Phosphite No. 2 | 1320 | 8.8 | 14.4 | 94.9 | 94.0 |
| 3 - 3 | Phenol No. 2 Phosphite No. 3 | 1450 | 7.2 | 12.1 | 90.0 | 88.3 |
| 3 - 4 | Phenol No. 2 Phosphite No. 4 | 1420 | 7.4 | 12.7 | 91.6 | 90.5 |

Comparative phenol A:
2,6-di-t-butyl-4-methyl phenol

Phenol No. 2:
3,5-di-t-butyl-4-hydroxyphenylpropionic acid pentaerythritol tetraester Comparative phosphite A:
bis (2,4-di-t-butyl phenyl) pentaerythritoldiphosphite Phosphite No. 1:
bis (2,6-di-t-butyl-4-methyl phenyl) pentaerythritoldiphosphite Phosphite No. 2:
bis [2,6-di-t-butyl-4-(2',4'-di-t-butylphenoxycarbonyl) phenyl] tentaerythritoldiphosphite 3,5-di-t-butyl-4-hydroxyphenylpropionic acid pentaerythritol tetraester Phenol No. 3:
3-t-butyl-4-hydroxy-5-methylphenylpropionic acid triethylene glycol diester Phenol No. 4:
3-t-butyl-4-hydroxy-5-methylphenylpropionic acid-3,9-bis (1,1-dimethyl-2-hydroxyethyl)-2,4,8,10-tetraoxaspiro [5,5] undecane diester Comparative phosphite A:
bis (2,4-di-t-butyl phenyl) pentaerythritoldiphosphite Phosphite No. 1:
bis (2,6-di-t-butyl-4-methyl phenyl) pentaerythritoldiphosphite

TABLE 4

| No. | Stabilizer | Thermo-stability (hours) | Heat coloring property Original | Heat coloring property After 1000 hours | Weather resistance Original | Weather resistance After 100 hours |
|---|---|---|---|---|---|---|
| Comparative example | Comparative phenol B Comparative | 1125 | 10.5 | 22.3 | 89.7 | 81.1 |

TABLE 4-continued

| No. | Stabilizer | Thermo-stability (hours) | Heat coloring property Original | Heat coloring property After 1000 hours | Weather resistance Original | Weather resistance After 100 hours |
|---|---|---|---|---|---|---|
| 4 - 1 | phosphite A | | | | | |
| 4 - 2 | Phenol No. 2 Comparative phosphite A | 1275 | 8.3 | 18.4 | 90.9 | 88.4 |
| Example 4 - 1 | Phenol No. 1 Phosphite No. 1 | 1395 | 7.5 | 13.2 | 95.4 | 94.2 |
| 4 - 2 | Phenol No. 2 Phosphite No. 1 | 1380 | 7.7 | 15.2 | 96.6 | 96.0 |
| 4 - 3 | Phenol No. 3 Phosphite No. 1 | 1443 | 7.0 | 10.1 | 94.4 | 93.1 |
| 4 - 4 | Phenol No. 4 Phosphite No. 1 | 1412 | 7.3 | 11.4 | 93.9 | 92.4 |

We claim:

1. A polyolefin composition which comprises 100 parts by weight of a polyolefin which has been produced with the use of a Ziegler catalyst and has a part or residue of catalyst left therein comprising 30 ppm or greater of metals coming from the Ziegler catalyst, 0.005 to 1 part by weight of a phenol compound having the formula (I) and 0.005 to 1 part by weight of an organic phosphite compound having the formula (II):

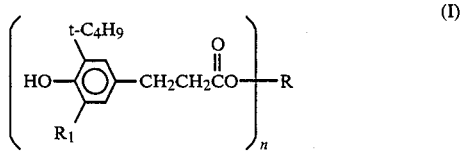

(I)

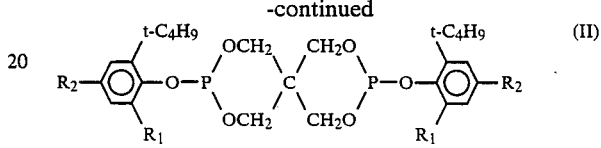

(II)

in which R is a residue group of an alcohol being monohydric, dihydric, trihydric or tetrahydric, R1 is methyl or tert.-butyl, R2 is an alkyl, —CH2CH2COOR3 or —COOR3, R3 being an alkyl, an aryl or an alkylaryl, and n is a number of 1 to 4.

2. A composition as claimed in claim 1, in which the alcohol for R is pentaerythritol, the alkyl for R2 has 1 to 9 carbon atoms, the alkyl for R3 has 1 to 18 carbon atoms, the aryl for R3 is phenyl and the alkylaryl for R3 is 2,4-di-tert.-butylphenyl.

3. A composition as claimed in claim 1, which further comprises an anti-oxidant containing sulfur and/or a light stabilizer.

* * * * *